United States Patent [19]

Nazmy et al.

[11] Patent Number: 4,627,896

[45] Date of Patent: Dec. 9, 1986

[54] METHOD FOR THE APPLICATION OF A CORROSION-PROTECTION LAYER CONTAINING PROTECTIVE-OXIDE-FORMING ELEMENTS TO THE BASE BODY OF A GAS TURBINE BLADE AND CORROSION-PROTECTION LAYER ON THE BASE BODY OF A GAS TURBINE BLADE

[75] Inventors: Mohamed Nazmy, Gebenstorf; Robert Singer, Untersiggenthal, both of Switzerland

[73] Assignee: BBC Brown, Boveri & Company Limited, Baden, Switzerland

[21] Appl. No.: 749,547

[22] Filed: Jun. 27, 1985

[30] Foreign Application Priority Data

Jul. 16, 1984 [CH] Switzerland .................. 3455/84

[51] Int. Cl.⁴ .................................................. C25D 5/50
[52] U.S. Cl. ............................ 204/37.1; 204/16;
204/29; 204/37.6; 204/40; 204/181.1;
204/181.5; 419/17; 419/38; 419/39; 419/40;
419/42; 419/48; 427/204; 427/318; 427/319;
427/376.1; 427/376.6; 427/376.7; 427/34;
428/331; 428/408; 428/450; 428/698
[58] Field of Search .................. 204/16, 181.1, 181.5,
204/29, 37.1, 40, 37.6; 428/331, 408, 450,
698–699; 427/204, 318–319, 376.1, 376.6, 376.7,
34; 419/17, 38–40, 42, 48

[56] References Cited

U.S. PATENT DOCUMENTS

| | | | |
|---|---|---|---|
| 3,296,693 | 1/1967 | Carter | 204/37.1 |
| 3,929,590 | 12/1975 | Heyes | 204/16 |
| 3,981,062 | 9/1976 | Moskowitz et al. | 419/17 |
| 4,079,552 | 3/1978 | Fletcher | 204/16 |
| 4,218,494 | 8/1980 | Belmondo et al. | 419/17 |
| 4,241,135 | 12/1980 | Lee et al. | 428/450 |
| 4,288,495 | 9/1981 | Terner et al. | 428/450 |
| 4,302,300 | 11/1981 | Chamska et al. | 204/16 |
| 4,447,466 | 5/1984 | Jackson et al. | 427/34 |

FOREIGN PATENT DOCUMENTS 28374 12/1971 Japan .................................. 204/37.1

OTHER PUBLICATIONS

"High-Temperature Inorganic Coatings" by J. Huminik Jr., Rheinhold Publish. Co., 1963, pp. 2, 31, 157.

Primary Examiner—R. L. Andrews
Attorney, Agent, or Firm—Oblon, Fisher, Spivak, McClelland & Maier

[57] ABSTRACT

Method for applying a corrosion-protection layer to the base body (1) of a gas turbine blade by embedding particles (3) of SiC in a metallic matrix by means of powder, paste or electrolytic/electrophoretic methods and compacting, welding or fusing and bonding the matrix-forming material to the base body (1) by means of hot-pressing, hot isostatic pressing or laser beam, electron beam or electric arc. Protective layers are formed which do not flake off and with high silicon content which is at least partially contained in the embedded, partly modified SiC particles (6) as a reservoir for the operation.

10 Claims, 2 Drawing Figures

METHOD FOR THE APPLICATION OF A CORROSION-PROTECTION LAYER CONTAINING PROTECTIVE-OXIDE-FORMING ELEMENTS TO THE BASE BODY OF A GAS TURBINE BLADE AND CORROSION-PROTECTION LAYER ON THE BASE BODY OF A GAS TURBINE BLADE

The invention is based on a method for the application of a corrosion-protection layer containing protective-oxide-forming elements according to the generic part of the preamble of claim 1 and on a corrosion-protection layer according to the generic part of claim 8.

Corrosion-protection layers, particularly high-temperature corrosion-protection layers are required in the construction of gas turbines to increase the service life and to achieve better operational behavior of highly stressed parts (turbine blades). In principle it is a question of incorporating protective-oxide-forming elements (eg. Cr, Al, Si) in the surface zone of the component or or applying them to the surface of the component as a more of less cohesive layer (usually embedded in a matrix). In operation the protective oxides then develop in the form of cohesive surface layers. It is known that $SiO_2$-forming surface layers are superior in many respects to the $Cr_2O_3$- and $Al_2O_3$-forming surface layers. They exhibit higher corrosion-resistance and in particular higher oxidation resistance at high temperatures than the two other variants (cf. M. W. Grünling and R. Bauer, The role of silicon in corrosion-resistant high temperature coatings, Int. Conf. on Metallurgical Coatings and Process Technology, San Diego USA, Apr. 5–8, 1982, Thin Solid Films, Vol. 95, No. 1, 1983).

However, $SiO_2$-forming layers have in spite of this scarcely been used up to the present point in time since the highly siliconised protective layers applied and the boundary zones exhibit unfavourable mechanical properties. As a result of their brittleness they do not adequately adhere to the base body, crack open or peel off.

It has therefore already been proposed to introduce silicon in the form of an inert phase, eg. as SiC (cf. V. Nagarajan and I. G. Wright, Investigation of techniques for preparation of high-temperature alloys capable of forming protective silica scales, Battelle Columbus Laboratories, Columbus, Ohio USA, EPRI Contract TPS 79-731, Final Report 1981).

Since at the present time none of the known processes for the production of SiC-containing surface layers (cathode-ray sputtering, vacuum evaporation, flame or plasma jet spraying etc.) appear suitable, there is a considerable need to disclose an approach which is practical and promising in this respect.

The invention is based on the object of providing a method for the application of silicon carbide to, or the introduction of silicon carbide into, the surface zone of a gas turbine blade consisting of a superalloy as the base body as well as a corrosion-protection layer exhibiting a high silicon content, for gas turbine blades.

This object is achieved by the features in the characterising part of claim 1 and of claim 8.

BRIEF DESCRIPTION OF THE DRAWINGS

The invention is described by reference to the following exemplary embodiments explained in more detail by figures.

The figures show.

DETAILED DESCRIPTION OF THE DRAWINGS

Figure 1:
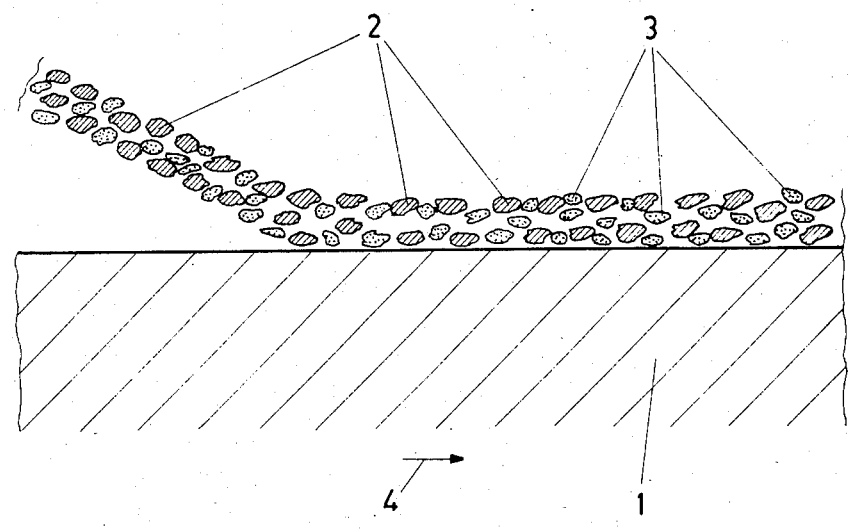
FIG. 1 a section through a base body to be coated at the instant of the application of a powder layer, FIG. 2 a section through a coated base body at the instant of the fusion of the powder layer applied.

FIG. 1 shows a diagrammatic section through a base body to be coated at the instant of the application of a powder layer. 1 represents a base body (base material, substrate) which is to be provided with a corrosion-protection layer. The present case concerns a detail of a component for a heat engine, eg. of a gas turbine blade consisting of a nickel-based superalloy. The powder mixture to be applied is represented diagrammatically as a mixture of the particles 2 of a superalloy and the particles 3 of silicon carbide. The direction of advance of the base body 1 during application of the powder mixture is indicated by the arrow 4.

The material to be applied is represented in this case as a loose powder mixture. However, FIG. 1 in principle also applies to all other such application methods: Charging of powder into a cavity between body 1 and die or casing, application of a paste by means of a paint brush or other appliance, etc.

Figure 2:
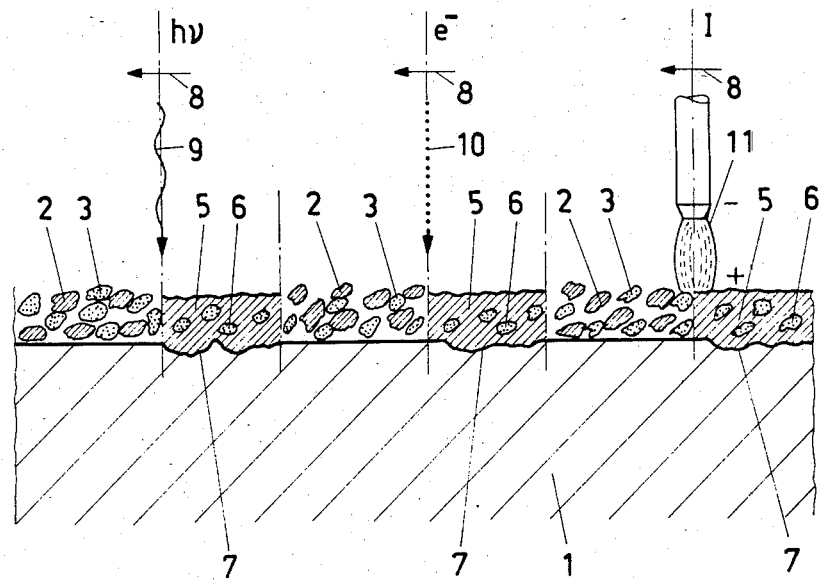

FIG. 2 represents a diagrammatic section through a coated base body at the instant of the fusion of the powder layer applied. The reference numbers 1 to 3 correspond exactly to those of FIG. 1. From the latter the state of the loosely sprinkled-on powder particles is evident. 5 in each case represents the fused and resolidified mass of the superalloy powder. This part which forms the matrix of the corrosion-protection layer is further bonded firmly to the base body 1 by a suitable fusion and solidification process. The corresponding bonding zone 7 of the corrosion-protection layer/base body is indicated by an irregular line. 6 represents the silicon carbide particles, some of which are fused or chemically modified, embedded in the mass 5 and their conversion products (complexes, multiple carbides and mixed carbides). In the figure, 3 different fusion processes and their associated means are represented. 9 relates to a laser beam (wavy line h ν), 10 to an electron beam (dotted line e−) and 11 to an electric arc (current supply electrode-, current I). The direction of advance in each case of the means used in the fusion of the powder mixture is indicated by arrows 8.

ILLUSTRATIVE EXAMPLE 1

A corrosion-protection layer was applied to a gas turbine blade of a nickel-based superalloy with the trade name MA 6000 (Inco). The superalloy had the following composition:

Ni=69 wt.%
Cr=15 wt.%
W=4.0 wt.%
Mo=2.0 wt.%
Al=4.5 wt.%
Ti=2.5 wt.%
Ta=2.0 wt.%
C=0.05 wt.%
B=0.01 wt.%
Zr=0.15 wt.%
$Y_2O_3$=1.1 wt.%

Alloy powder of the same composition given above was mixed with silicon carbide powder in the volume ratio 1:1: SiC content of the powder mixture approx. 28 wt.-%; C content approx. 8.4 wt.-%; Si content approx.

19.6 wt.-%. The powder mixture had an average grain size of approx. 60 μm (Largest grain approx. 100 μm). The gas turbine blade was placed in the die of a forging press in a manner such that a cavity of approx. 2 to 3 mm was present on all sides which was charged with the powder mixture. The blade was thus embedded on all sides in the powder. The whole was then isothermally hot-pressed for 5 s at a temperature of 900° C. and a pressure of 500 Mpa. In this process the particles of the alloy powder welded both among themselves and with the mass of the superalloy of the blade to a solid, dense, compact body, in the boundary zone of which the SiC particles were incorporated. The latter had partially reacted with the superalloy material so that an exchange of the elements involved (chemical conversion occurred. By analysis it was found that the corrosion-protection layer, which exhibited an average thickness of approx. 1 mm, consisted essentially of a matrix with a high nickel content into which some of the silicon had migrated. Various particles of complex phases were embedded in this matrix. Inter alia mixed carbides of W, Mo, Cr, Ta and Ti were found in addition to those containing unchanged SiC. Both the silicon-containing matrix and the carbides still containing silicon function in operation as a reserve (reservoir) for the formation of the $SiO_2$-containing surface layer.

ILLUSTRATIVE EXAMPLE 2

A gas turbine blade of the alloy Ma 6000 corresponding to the composition of Example 1, previously annealed to produce elongated coarse grain, was provided with a corrosion-protection layer. First alloy powder of the same composition as the base body 1 (FIG. 1) was mixed in the volume ratio 1:1 with silicon carbide powder: SiC content of the powder mixture approx. 28 wt. %; C content approx. 8.4 wt. %; Si content approx. 19.6 wt. %. The average grain size of the powder mixture was 20 μm (largest grain approx. 40 μm). From 1 mm thick soft-iron sheet a casing was shaped whose cavity dimensions (internal dimensions) exceeded those of the gas turbine blade by approx. 4–5 mm: single-side distance of the inner wall of the casing from the surface of the blade approx. 2–2.5 mm. This cavity was filled with the powder mixture and the casing was then welded together in a gas-tight manner. The whole was then subjected to a hot-isostatic pressing process at a pressure of 150 Mpa and a temperature of 1200° C. for ½ h. After pressing the soft-iron layer was removed by mechanical machining. Underneath there had formed a corrosion-protection layer approx. 1–1.2 mm thick which was firmly welded to the base body 1, in the superalloy matrix of which layer were incorporated discrete particles of carbides which act as reservoirs for the oxide surface layer.

ILLUSTRATIVE EXAMPLE 3

See FIGS. 1 and 2:

A corrosion-protection layer was applied to a gas turbine blade of the same alloy MA 6000 as in Example 1 by the paste method. Alloy powder (particles 2) of the same composition as the base body 1 were mixed in the volume ratio 1:2 with silicon carbide powder (particles 3): SiC content of the powder mixture approx. 44 wt. %; C content approx. 13.2 Wt. %; Si content approx. 30.8 wt. %. The powder mixture had an average grain size of 25 μm (largest grain approx. 40 μm). This powder mixture was stirred in an organic solvent to produce a suspension. For this purpose approx. 50–60 ml of terpineol $C_{10}H_{18}O$ were added to 100 g of powder mixture so that a viscous, brushable paste was formed. This paste was applied in a layer thickness of approx. 2 mm to the gas turbine blade on all sides and the solvent expelled by heating. The particles 2 of the superalloy in the layer applied were then fused by means of laser beam 9 with a power of 5 kw and firmly anchored to the base body 1 in the bonding zone 7 as a resolidified mass 5. The particles 6 embedded in the latter and partially converted showed a certain proportion of complex mixed carbides in addition to SiC. Part of the elementary silicon liberated was dissolved in the matrix of the mass 5. The finished corrosion-protection layer exhibited a thickness of approx. 0.8 mm.

ILLUSTRATIVE EXAMPLE 4

A gas turbine blade was coated in the same way as specified in Example 3 by the paste method. The fusion and melting of the alloy powder into the base body 1 were, however, accomplished by means of an electron beam 10. The result was a cohesive corrosion-protection layer firmly anchored to the base body 1 of an analogous texture and similar composition to that in Example 2.

ILLUSTRATIVE EXAMPLE 5

As the base body 1 a gas turbine blade of the alloy MA 6000 according to Example 1 was used. The blade was first degreased with a 10% sodium hydroxide solution at 40° C. and then anudically pickled in 20% sulphuric acid at room temperature. For this purpose the workpiece was connected to the positive pole of a direct current source and suspended in a pickling bath. After rinsing with water the workpiece was electrochemically provided with a chromium layer approx. 0.15 mm thick. After a further rinsing the chromium plated workpiece was introduced into a second electrolytic bath which contained, in addition to dissolved nickel and boron salts, also approx. 150 g of silicon carbide per l of liquid in suspension. The silicon carbide particles had a grain size of 4 to 12 μm and were held in suspension by vigorous bath movement. By a combined electrolysis and electrophoretic process nickel (as the cohesive matrix) and silicon carbide (as the embedded particles) were as a result simultaneously deposited on the surface of the chromium-plated base body 1 in a thickness of approx. 0.85 mm. In this process nickel and chromium taken together so to speak took over the function of the powder particles 2 and the silicon carbide that of the powder particles 3 in FIG. 1. The entire surface layer applied had a thickness of approx. 1 mm and exhibited approximately the theoretical density. In a subsequent fusion and melting-in process the layer was heat-treated by means of an electric arc 11 as shown in FIG. 2, and a mass 5 similar to the base body 1 was formed as the matrix (Cr/Ni alloy) with embedded particles 6 as an additional silicon reservoir. Here too, in the finished corrosion-protection layer it was possible to detect the carbides of silicon, chromium and, in lower concentration, those of tungsten, molybdenum and tantalum, as well as the corresponding mixed carbides in the bases mass in addition to silicon.

Naturally, the specified process steps can be repeated several times and the sequence can also be reversed. Also the addition of the silicon carbide powder can likewise take place in the chromium electrolytic bath. Instead of silicon carbide alone silicides, eg. chromium silicide $Cr_3Si$, can also be additionally added to the nickel electrolytic bath as a suspension. In this way surface layers of any desired thickness and composition can be obtained. Through the subsequent fusion and melting-in process the structure and composition of the matrix of the surface layer can be largely optimised and matched to the alloy of the base body 1.

Under certain circumstances, in particular for reduced requirements, fairly low protective-layer thicknesses and fairly small workpiece dimensions it is possible to do without the first step of chromium plating the base body 1 and to work with a nickel electrolytic bath alone, with or without additions of suspended chromium-containing particles (Cr, $Cr_3Si$ etc.).

The invention is not limited to the illustrative examples. Any method which ensures the simultaneous deposition of a metallic base mass (in layer or particle form) and discrete SiC particles can be used as the application method. If a powder mixture is used for this purpose, the particle size can advantageously be 10 to 100 μm. If the paste method is employed, the powder mixture can be advantageously suspended in an organic solvent (terpineol, dimethylformamide) to form a viscous mass. In the case of the electrolytic/electrophoretic application several baths can be used in sequence. The compression/compacting/welding step can be accomplished by fusion (a form of local fusion welding) of the metal component by means of a laser beam, electron beam or electric arc, or by hot-pressing (a form of pressure welding, sintering, pressure sintering, diffusion bonding etc).

The hot-pressing can advantageously be carried out at a temperature of 900° C. and a pressure of up to 500 Mpa for a period of 0.5 to 10 s corresponding to a degree of deformation of approx. 0.2 and a rate of deformation of $0.2 \cdot 10^{-1} s^{-1}$ to $4 \cdot 10^{-1} s^{-1}$. If hot-isostatic pressing is used for the manufacture of the corrosion-protection layer it is advantageous to start from a base body 1 of the gas turbine blade initially annealed to produces a coarse grain structure and to carry out the subsequent hot-isostatic pressing at a temperature of 1200° C. and a pressure of 100–150 Mpa for a period of ½ to 3 h. However, if the base body 1 is only available as a fine-grained initial material, pressing must not be carried out at more than 900° C. in order to prevent recrystallisation in an undesired direction, which would then require pressures of 500 Mpa and times of up to 5 h.

The composition of the metallic matrix of the corrosion-protection layer can be approximately the same as that of the base body 1 of the gas turbine blade. It may further consist of nickel, a nickel/chromium alloy or of cobalt. This latter case usually occurs if the matrix-forming material is applied electrochemically (galvanically) to the base body 1.

The advantage of the new corrosion-protection layer consists in the fact that, despite the high Si content, it does not have the usual brittleness and does not peel off from the base body 1 in operation. In addition, a rapid diffusion of silicon into the base body 1 is prevented. The silicon migrates slowly from the discretely embedded SiC particles into the matrix and constantly forms $SiO_2$-containing surface layers along the surface. Since this subsequent dispensation extends over a fairly long time interval, a long service life and high effectiveness of the corrosion-protection layer may be expected.

We claim:

1. A method for applying a corrosion protection layer to a base body of a gas turbine blade, which comprises applying to said base body, silicon carbide particles together with a superalloy material in the form of particles or layers which forms a metallic matrix of the protective layer,
compacting, pressing, and welding or fusing said matrix-forming material such that the protective layer matrix is firmly bonded to said base body, wherein silicon carbide particles are at least partially embedded in the form of fine particles which negligibly protrude above the surface of said protective layer matrix, and said silicon carbide particles partially react with said matrix-forming material so that some silicon migrates into said matrix.

2. Method according to claim 1, characterised in that the SiC and the material forming the metallic matrix of the protective layer are applied in the form of a powder mixture or a paste to the base body (1) of the gas turbine blade.

3. Method according to claim 1, characterised in that the SiC is deposited electrophoretically in particle form and the material forming the metallic matrix of the protective layer is simultaneously electrolytically deposited in layer form on the base body (1) of the gas turbine blade.

4. Method according to claim 1, characterised in that at least individual components of the material forming the metallic matrix of the protective layer are deposited electrolytically in a series of layers on the base body (1) of the gas turbine blade sequentially and alternately simultaneously with the electrophoretic deposition of SiC.

5. Method according to claim 1, characterised in that the superficial compacting, pressing and welding of the material forming the matrix take place by hot-pressing for 0.5 to 10 s at a temperature of 900° C. and a pressure of up to 500 Mpa.

6. Method according to claim 1, characterised in that the base body (1) of the gas turbine blade is subjected to a coarse-grain annealing before it is coated with a corrosion-protection layer and that the superficial compacting, pressing and welding of the material forming the matrix take place by hot-isostatic pressing of a powder mixture for ½–3 h at a temperature of 1200° C. and a pressure of 100–150 Mpa loaded into a soft-iron sheet body sealed on all sides and that the soft-iron sheet body is removed mechanically or chemically after the powder has been hot-isostatically pressed.

7. Method according to claim 1, characterised in that the said fusing of the material forming the matrix is accomplished by a laser beam (9) or an electron beam (10) or an electric arc (11).

8. Corrosion-protection layer on the base body of a gas turbine blade consisting of a metallic matrix and particles of protective-oxide-forming elements embedded in the latter, characterized in that the protective-oxide-forming element is silicon, which is present in the form of discretely embedded, partially modified SiC particles, wherein said SiC particles partially react with said matrix so that some silicon migrates into said matrix.

9. Corrosion-protection layer according to claim 8, characterised in that the metallic matrix has approximately the same composition as the base body (1) of the gas turbine blade.

10. Corrosion-protection layer according to claim 8, characterised in that the metallic matrix consists of nickel or a nickel/chromium alloy or of cobalt.

* * * * *